United States Patent [19]
Boggs

[11] Patent Number: 4,892,018
[45] Date of Patent: Jan. 9, 1990

[54] DEFLASHING METHOD AND APPARATUS

[75] Inventor: Beryl A. Boggs, Richmond, Va.

[73] Assignee: Allied-Signal Inc., Morris Township, Morris County, N.J.

[21] Appl. No.: 771,963

[22] Filed: Sep. 3, 1985

[51] Int. Cl.⁴ .............................................. A47L 11/12
[52] U.S. Cl. ......................................... 83/15; 83/914; 30/140; 30/277.4
[58] Field of Search ................. 30/140, 272 R, 272 A; 83/914, 15

[56] References Cited

U.S. PATENT DOCUMENTS

| | | |
|---|---|---|
| 2,781,839 | 2/1957 | Bockrath et al. .................. 30/140 X |
| 2,972,035 | 2/1961 | Miller ...................... 30/140 |
| 3,365,797 | 1/1968 | Cook ...................... 30/140 |
| 3,704,188 | 11/1972 | MacDuff ........................... 83/914 X |
| 3,827,186 | 8/1974 | Ehnot . |
| 3,909,988 | 10/1975 | Kerwin et al. . |
| 4,074,110 | 2/1978 | Slaughter .......................... 30/140 X |
| 4,286,383 | 9/1981 | Farden ........................... 30/272 R X |
| 4,312,156 | 1/1982 | McWhorter . |

FOREIGN PATENT DOCUMENTS 24111 3/1981 Japan .
196212 11/1984 Japan .

Primary Examiner—James F. Coan

[57] ABSTRACT

Method and apparatus for deflashing a fiber reinforced plastic article are provided. The method features cutting the flash away from the article with an edge heated to a temperature of at least about 800° F. (427° C.). The apparatus features a cutting edge and means for heating the cutting edge to a temperature of at least about 800° F. (427° C.).

9 Claims, 2 Drawing Sheets ns. Suitable thermosetting resins include polyester (preferably unsaturated), polyurethane, epoxy, or a vinylester resin system. Suitable thermoplastic resin systems include polyvinyl chloride, polyethylene, polypropylene, polystyrene, polyvinyl alcohol, polyamide, polyurethane, etc.

DEFLASHING METHOD AND APPARATUS

BACKGROUND OF THE INVENTION

1. Field of the Invention

This invention relates to a method and apparatus for deflashing a fiber reinforced plastic article. More particularly, this invention relates to a deflashing method and apparatus for molded plastic articles reinforced with fibers which would remain as whiskers in the flash area if the articles were deflashed utilizing prior art techniques.

2. The Prior Art

When articles are molded from thermosets, thermoplastics, rubber and the like, the initial product often has extra material called "flash" attached along the mold parting line. Flash results from that portion of the charge which flows from or is extruded from the mold cavity during molding, and is undesirable on most final products.

The removal of flash, or "deflashing", has been accomplished in many ways, e.g., manual deflashing with razor blades, rotation or shaking with abrasive media to break off the flash, and cryogenic deflashing. In the latter, flash is cryogenically embrittled followed by impact with deflashing media, such as pelletized steel or plastic shot, and/or tumbling. Various types of cryogenic deflashing apparatus are taught by U.S. Pat. Nos. 3 827 186 to Ehnot, 3 909 988 to Kerwin et al., 4 312 156 to McWhorter and 4 519 812 Brull et al., all of which are hereby incorporated by reference.

Deflashing has been complicated by the inclusion of some types of reinforcing staple fibers in charges (compounds) to be molded. When polyester staple fibers are added, the flash itself can be removed, but the molded part is left with polyester fiber whiskers/tendrils protruding at the parting line in the original area of flash. This is not a problem with fiber glass reinforced plastic parts, since fiber glass easily breaks away during deflashing.

The present invention has been developed to overcome the problem of fiber whiskers protruding from the plastic part after using prior art deflashing techniques.

SUMMARY OF THE INVENTION

The present invention relates to a method and apparatus for deflashing a fiber reinforced plastic article.

The method comprises cutting the flash away from the article with an edge heated to a temperature of at least about 800° F. (427° C.), more preferably about 1000°–1200° F. (538°–648° C.). The method optionally includes the step of vibrating the cutting edge.

The apparatus for deflashing comprises a cutting edge and means for heating the cutting edge to a temperature of at least about 800° F. (427° C.), more preferably about 1000°–1200° F. (538°–648° C.). It is preferred that the cutting edge be either a knife or file, and that the apparatus further comprises means for vibrating the cutting edge.

Any type of fiber which cannot be cleanly removed from the flash area during deflashing of a plastic article reinforced therewith is contemplated by this invention. Preferred reinforcing fibers are polyesters and polyamides. Most preferred are polyethylene terephthalate and nylon-6.

The resin matrix utilized in forming the compound to be molded (injection, compression or resin transfer molding) may include thermosetting or thermoplastic (including polyolefin) resins. Suitable thermosetting resins include polyester (preferably unsaturated), polyurethane, epoxy, or a vinylester resin system. Suitable thermoplastic resin systems include polyvinyl chloride, polyethylene, polypropylene, polystyrene, polyvinyl alcohol, polyamide, polyurethane, etc.

BRIEF DESCRIPTION OF THE DRAWINGS

In the accompanying drawings.

DETAILED DESCRIPTION OF INVENTION

Figure 1:
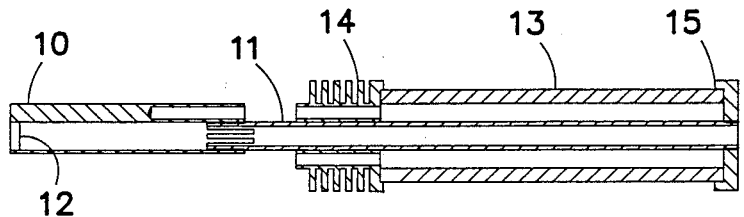
FIG. 1 is a sectional view of a manual deflashing unit of the present invention.

In the accompanying drawings, like numbers refer to like apparatus. Depicted in FIG. 1 is a triangular-shaped, hollow blade having three razor sharp edges (see FIG. 3B). Blade 10 is screwed onto a hollow handle rod 11, coaxial therewith. Electrical cartridge heater 12 is inserted into the hollow of blade 10 with its wires run through handle rod 11 and connected via a plug to a rheostat (unshown), preferably a Variac unit (which adjusts the amount of current going to the heater). An insulated handle 13 and cooling fins 14 are fixed to the handle rod 11. End cap 15 screws on the base of handle 13 around rod 11. Cooling fins 14 function to disperse heat from blade 10 away from handle 13.

Figures 3A, 3B, 3C:
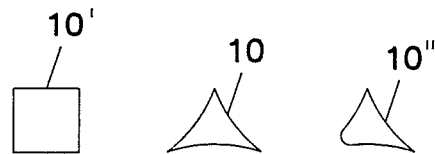
FIGS. 3A, 3B and 3C are plan views of files/blades which can be used in the present invention.

It is possible to connect cartridge heater 12 to handle rod 11 prior to putting on blade 10. This permits freely changing the cutting edge to be placed on the hand-held device without having to remove cartridge heater 12. With reference to FIGS. 3A, 3B and 3C, shown are several shapes of edges that may be used. In FIG. 3A a square file (ridged) is shown; in FIG. 3B a triangular-shaped blade with three razor sharp edges is shown; and in FIG. 3C is shown a blade having two razor sharp edges and a curved portion in between for smoothing the plastic part deflashed by the cutting edge. Many blade/file configurations would prove satisfactory in the present invention.

To use the deflashing apparatus of FIG. 1, one would turn the rheostat to achieve the desired blade 10 temperature via cartridge heater 12. The blade temperature must be at least 800° F. (427° C.). At temperatures of less than 800° F. (427° C.), the fiber whiskers are not melted/burned away quickly enough to provide a clean smooth surface.

Figure 2:
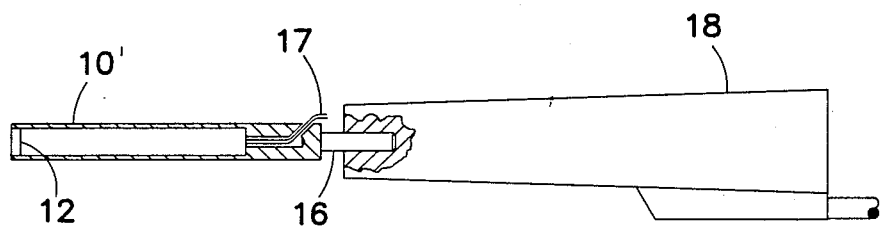
FIG. 2 is a side view partially in section of apparatus with the optional vibrator attached.

With reference to FIG. 2, file 10' with cartridge heater 12 therein and having wires 17 which lead to an unshown rheostat, has a peg 16 for fixing it into a handheld pneumatic vibrator 18. Vibrator 18 may be any commercially available handheld pneumatic vibrator, e.g., Nittokohka Super Hand or equivalent. To use the handheld device of FIG. 2, the rheostat is turned up to achieve the desired file 10' temperature via heater 12 followed by turning vibrator 18 switch on.

In operation, either of these devices is held in the hand and the cutting edge placed at the mold parting line to remove the flash. These devices readily deflash molded plastic parts while simultaneously burning off any staple reinforcing fiber whiskers that would be left by prior art deflashing techniques.

Adapters (unshown) may be used which screw on to the blade/file end of handle rod 11 to permit use of different heaters 12, blades 10, or files 10'.

In FIG. 2, cutting edge 10' is heated electrically to approximately 1000° F. (538° C.) and is caused to oscillate at approximately 40,000 cycles per minute at an amplitude of approximately 0.125 inch (0.318 cm). The edge 10' is guided passed the plastic part as the edge trims the flashing from the finished part.

Figure 4:
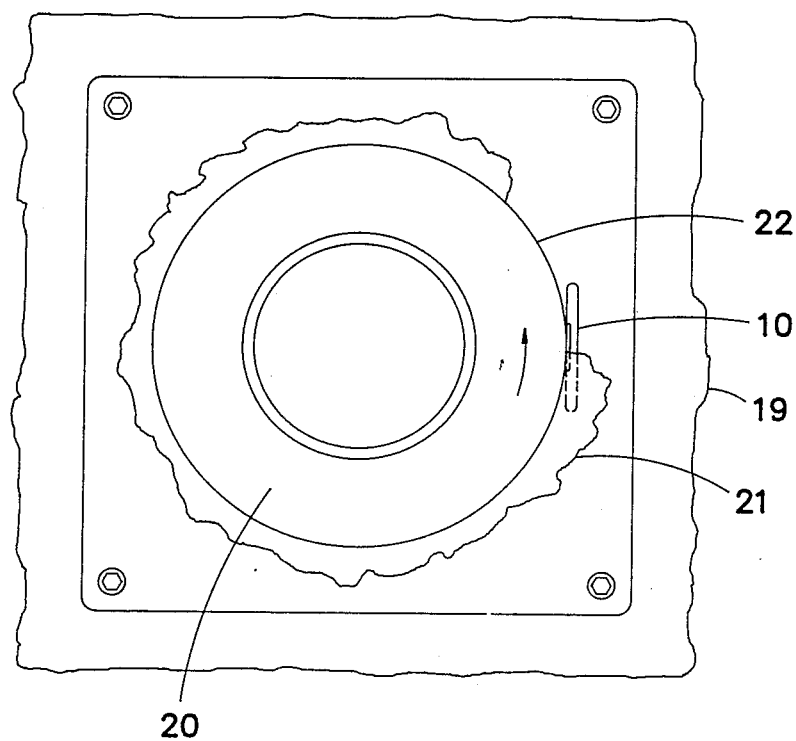
FIG. 4 is a plan view of an inverted bowl being deflashed by a blade protruding through an opening in the table top on which the part rests.

With reference to FIG. 4, the device of the present invention may also be used in conjunction with a table wherein the heated cutting edge protrudes through the table top 19. The blade 10 is heated electrically to approximately 1000° F. (538° C.) and is caused to oscillate at approximately 20,000 cycles per minute at an amplitude of approximately 0.002 inch (about 0.005 cm). The plastic part 20 (an inverted bowl) is guided past the cutting edge 10 as the edge trims the flashing 21 from the finished part. The trimmed part is smooth with no evidence of fiber whiskers.

I claim:

1. Apparatus for deflashing a fiber reinforced plastic article comprising a cutting edge, means for heating the cutting edge to a temperature of at least 800° F. (427° C.), and means for vibrating said cutting edge.

2. The apparatus of claim 1 wherein said cutting edge is a file.

3. The apparatus of claim 1 wherein said cutting edge is a knife.

4. The apparatus of claim 1 wherein the means for heating the cutting edge heats the cutting edge to a temperature of about 1000°–1200° F. (538°–648° C.).

5. The apparatus of claim 4 wherein said cutting edge is a file.

6. The apparatus of claim 4 wherein said cutting edge is a knife.

7. A method of deflashing a fiber reinforced plastic article which comprises reinforcing fiber selected from the group consisting of polyester and polyamide, said method comprising cutting the flash and reinforcing fiber away from the article with a vibrating cutting edge heated to a temperature of at least 800° F. (427° C.).

8. The method of claim 7 wherein said vibrating edge is heated to a temperature of about 1000°–1200° F. (538°–648° C.).

9. A method of deflashing a polyester fiber reinforced molded plastic article comprising cutting the flash away from the article with a vibrating edge and simultaneously exposing the flash to a temperature of about 1000°–1200° F. (538°–648° C.) for one to two seconds.

* * * * *